United States Patent [19]

Hayes

[11] 3,958,353
[45] May 25, 1976

[54] TWO PIECE ANIMAL IDENTIFICATION TAG ASSEMBLY

[76] Inventor: Norman J. Hayes, Standing Star Simmental Ranch, P.O. Box 618, North of Cody, Park County, Cody, Wyo. 82414

[22] Filed: Apr. 29, 1974

[21] Appl. No.: 465,286

[52] U.S. Cl. .................................................. 40/301
[51] Int. Cl.² ......................................... G09F 3/00
[58] Field of Search ............................. 40/300–302, 40/305, 20 R, 22

[56] References Cited
UNITED STATES PATENTS

| | | | |
|---|---|---|---|
| 3,260,007 | 7/1966 | Hayes | 40/301 |
| 3,346,980 | 10/1967 | Wallace | 40/302 |
| 3,388,492 | 6/1968 | Nichols, Jr. | 40/301 |

FOREIGN PATENTS OR APPLICATIONS 1,241,185  5/1967  Germany .............................. 40/301

Primary Examiner—Louis G. Mancene
Assistant Examiner—John H. Wolff
Attorney, Agent, or Firm—Bruce G. Klaas

[57] ABSTRACT

An animal identification tag assembly comprising an identification member and an attachment member. The identification member is mounted on the upper surface of the ear with a base portion supported on the upper surface and an identification portion extending upwardly from the base portion. The attachment member is mounted beneath the ear with a base portion abutting the lower inner surface of the ear and an attachment portion extending through the ear into retaining association with the identification member.

16 Claims, 8 Drawing Figures

U.S. Patent  May 25, 1976  Sheet 1 of 2  3,958,353
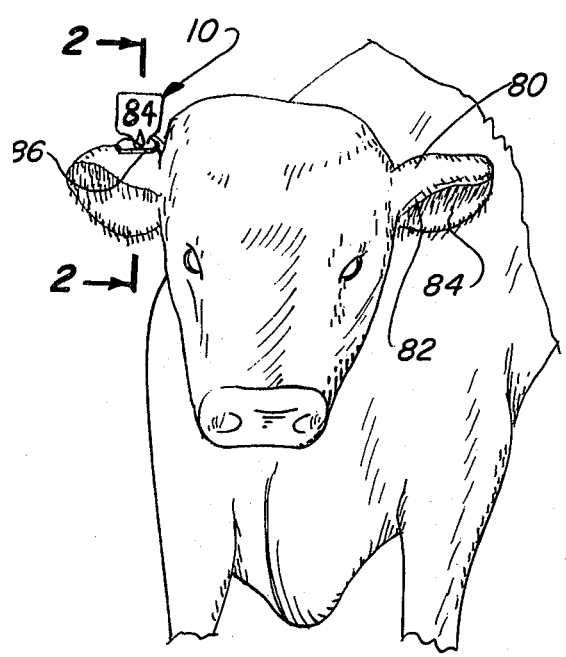
Fig_1
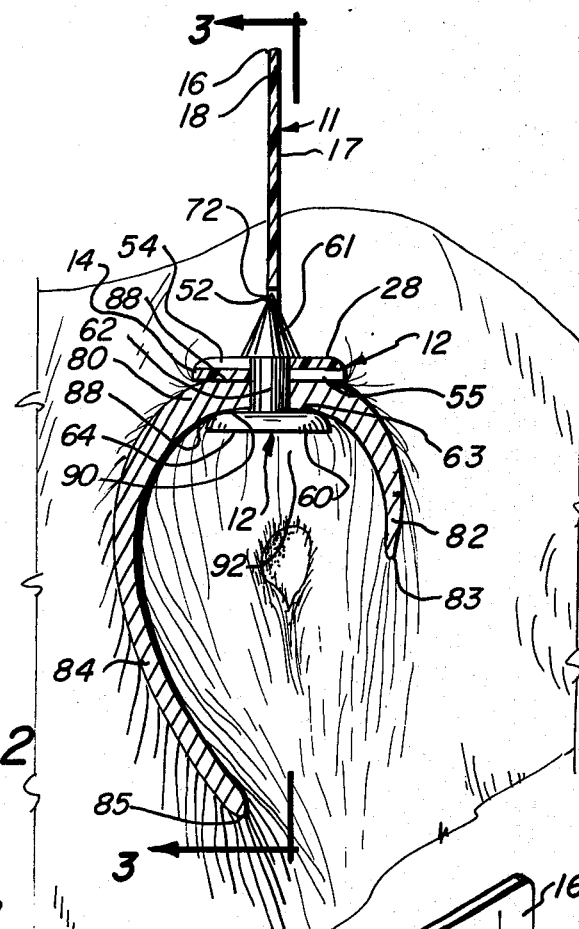
Fig_2
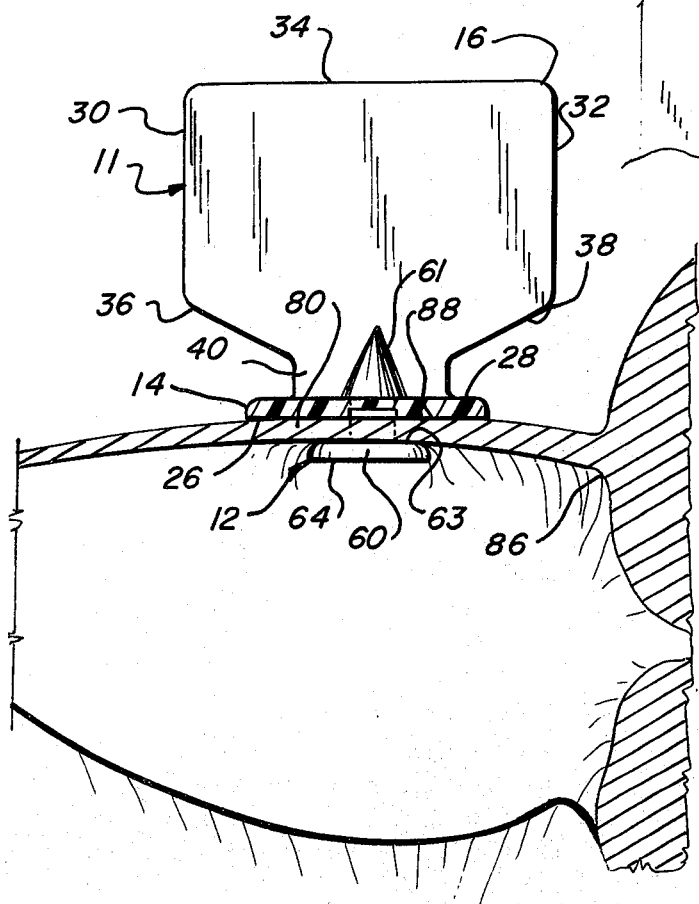
Fig_3
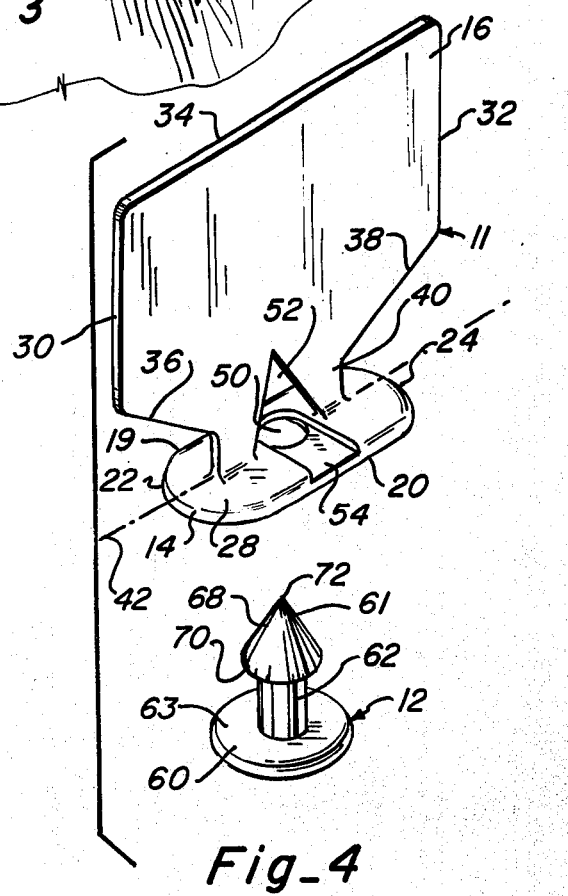
Fig_4

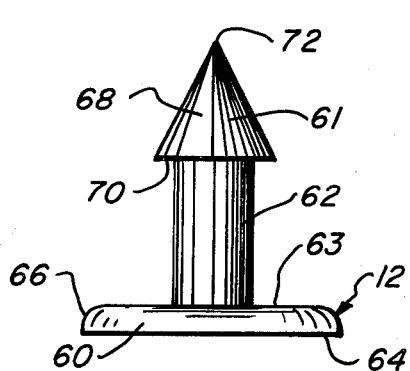
Fig_5
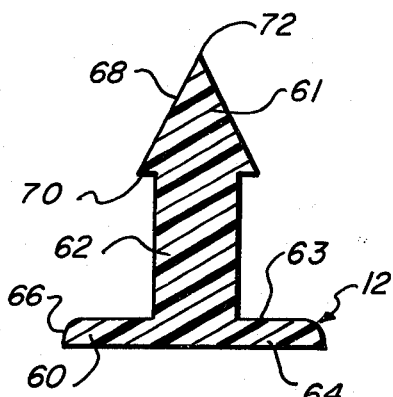
Fig_6
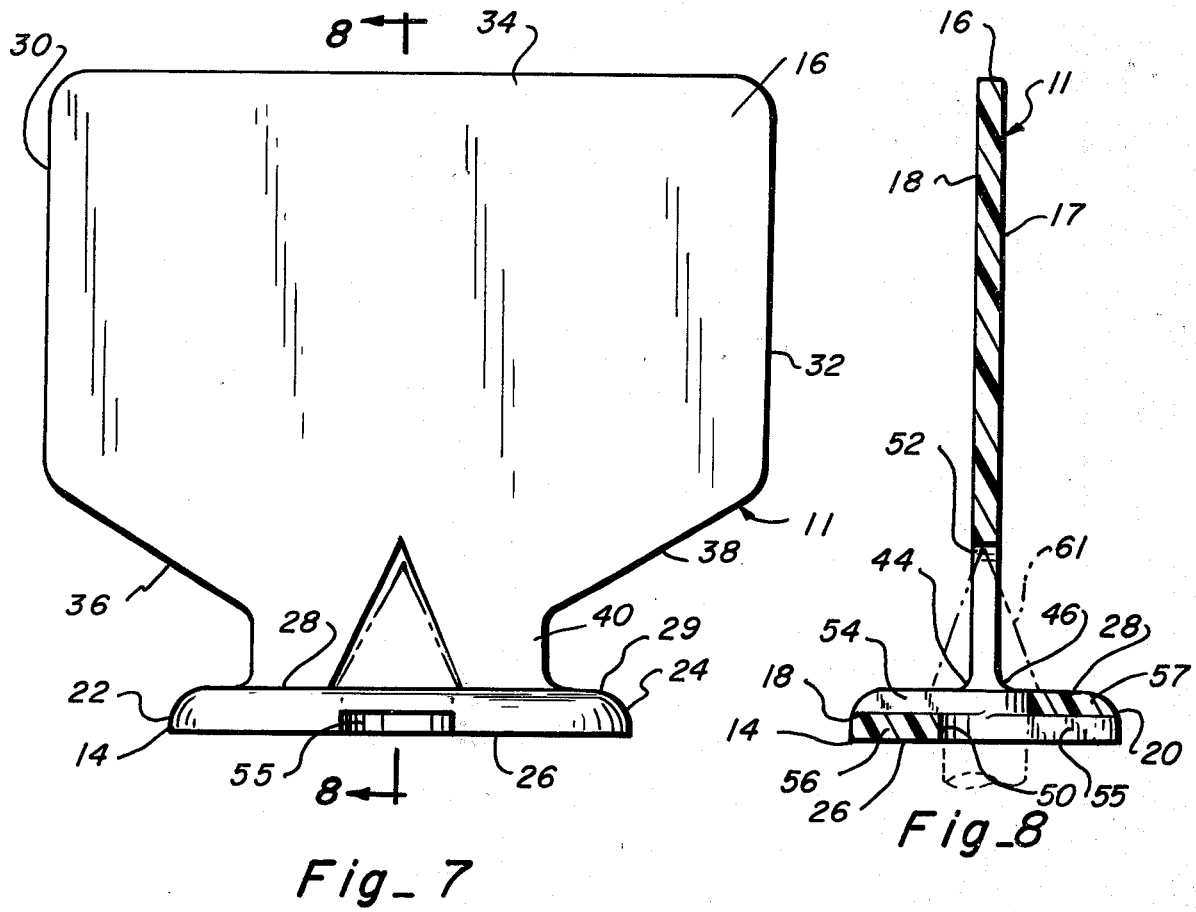
Fig_7  Fig_8

TWO PIECE ANIMAL IDENTIFICATION TAG ASSEMBLY

BACKGROUND AND SUMMARY OF INVENTION

This invention relates to identification tag assemblies for animals and, more particularly, to an identification tag assembly adapted to be mounted on the top of an ear of an ox type animal such as the bovine species so as to stand up on the ear in a vertical position.

The concept of utilizing identification tags on animals is at least as old as the disclosures in U.S. Pat. Nos. 29,619, 48,055, and 54,127 and there have been a substantial number of patents granted in the art since that time.

The most common type of identification tag presently being utilized for cattle appears to be the ear mounted type tag of the general type disclosed in my prior U.S. Pat. No. 3,260,007. The presently utilized tag assemblies may be generally characterized as "hang-down" types in that they are mounted in the relatively thin lower rear part of the animal ear and hang downwardly in a more or less downwardly depending position. One of the problems with such tag assemblies is that they are difficult to see from a distance and they are often obscured by the animal ear, animal hair on the ear which is often quite heavy and lengthy, and the animal head or body. Another problem with ear tags of the hand down type is that they may be caught in fences, building materials, and vegetation with the result that they may be broken apart or torn from the animal ear.

The present invention is adapted to solve the foregoing problems, and others, by utilizing a stand-up type ear tag of particular characteristics mounted on an animal ear in a particular place in a particular manner. While the general concept of a stand-up type ear tag is disclosed in U.S. Pat. No. 492,838, the present invention involves providing new and improved ear tag structure adapted to be mounted on a particular portion of the animal ear. While the outermost portions of the ear of the bovine species are relatively thin, there is a relatively thick upper central portion relatively closely adjacent the animal head which I have found to be particularly well suited for attachment of a stand-up type ear tag.

The structure of the tag assembly comprises a tag member having an elongated base portion adapted to be seated on the upper surface of the selected portion of the ear and fixedly held thereon by an attachment member having an attachment head portion inserted through the selected ear portion from below. The head portion is snap fitted to the base portion of the tag member and the base portion of the attachment member is snuggly held within the confines of a pocket formed on the underside of the ear. An identification portion of the tag member extends vertically upwardly above the ear and generally parallel to the longitudinal axis of the ear so as to provide front and rear facing identification surfaces.

BRIEF DESCRIPTION OF THE DRAWING

In the accompanying drawing, which shows an illustrative and presently preferred embodiment of the inventive concepts, FIG. 1 is a front view of an animal of the bovine species having a tag assembly of the present invention mounted on one ear;

FIG. 2 is a sectional view of the tag assembly in mounted position taken along the line 2—2 of FIG. 1;

FIG. 3 is another sectional view of the tag assembly in mounted position taken along line 3—3 of FIG. 2;

FIG. 4 is an exploded perspective view of the tag assembly of FIGS. 1-3;

FIG. 5 is a side elevational view of the attachment member of the tag assembly of FIGS. 1-4;

FIG. 6 is a cross-sectional view of the attachment member of FIG. 5;

FIG. 7 is a side elevational view of the tag member of the tag assembly of FIGS. 1-4; and FIG. 8 is a cross-sectional view of the tag member of FIG. 7.

DETAILED DESCRIPTION

The terms "vertical," "upper," "lower," "upwardly," "downwardly," "forwardly," "rearwardly," "inner," "outer" and related terms used in this specification and the appended claims refer to the normal position of the tag assembly when mounted on the ear of an animal.

Referring now to FIGS. 1-4 of the drawing, the present invention relates to an animal identification tag assembly 10 comprising an identification member 11 and an attachment member 12. The identification member 11 is made of one integral piece of molded plastic material, a urethane being presently preferred, comprising a base portion 14 and an enlarged identification portion 16 which is adapted to bear suitable identifying indicia applied to forwardly and/or rearwardly facing (relative to the animal) marking surfaces 17, 18 in any suitable manner such as by ink markings or hot stamping.

The base portion 14 has an elongated generally oval peripheral configuration, as seen in plan view, with spaced parallel side edges 19, 20 connected by rounded end edges 22, 24. In the present preferred embodiment, the base portion has a length of 1.5 inch, a width of 0.875 inch, and a thickness of 0.15 inch. The base portion has a substantially flat bottom surface 26 providing a lower downwardly facing abutment surface adapted to lay flat against an outer ear surface of an animal so that the identification portion 16 will extend upwardly substantially vertically above the ear of an animal. In this manner, the identification portion is easily seen from a distance and the indicia thereon may be read without having to handle the tag or the animal. The base portion has a substantially flat upper upwardly facing surface 28 connected to the bottom surface by a rounded side surface 29. The thickness of the base portion is such as to provide sufficient rigidity to firmly mount the tag on the animal ear while having sufficient flexibility so as to relatively closely conform to the animal ear on which it is mounted.

The identification portion 16 is of relatively thin thickness and, in the presently preferred embodiment, has a thickness of 0.06 inch such as to be sufficiently flexible to permit resilient flexing movement from the normal vertical position to a temporary horizontal position while under application of any force which may be encountered while attached to the animal. In addition, the identification portion is similarly resiliently flexible in any other direction so that the identification portion will bend or twist under application of force and then return to the normal upstanding vertical position when the force is removed.

The identification portion has a general polygonal configuration in side elevation defined by spaced parallel generally vertically extending side edge surfaces 30, 32, a generally horizontally extending upper edge surface 34, and a pair of inwardly downwardly inclined bottom edge surfaces 36, 38 which merge into integral resilient connecting means in the form of a vertically extending connecting flange portion 40 of reduced width relative to side edge surfaces 30, 32 so as to provide the desired flexibility of identification portion 16 relative to base portion 14. In the presently preferred embodiment, the width of the identification portion as measured between side edge surfaces 30, 32, is 2.4 inches and the height, as measured between upper surfaces 28 of base portion 14 and the upper edge surface 34, is approximately 2.05 inches. The identification portion 16 and the connecting flange portion 40 are centrally located and extend generally parallel to the longitudinal axis 42 of the base portion 14. The bottom of the connecting flange portion, which has a width of 1.0 inch is connected to the base portion by outwardly rounded surfaces 44, 46.

First tag attaching means are provided on the identification member centrally of the base portion 14 and the connecting flange portion 40 in the form of an annular vertical bore 50 in the base portion, the surrounding portions of upper surface 28 which provide an upwardly facing abutment surface, and a conical slot 52 in the connecting flange portion located in general vertical alignment above bore 50. In the presently preferred embodiment, the diameter of the bore is 0.3 inch, the height of the slot is 0.45 inch, and the length of the base of the slot is 0.4 inch. An upwardly facing slot 54 intersects and extends outwardly from bore 50 to one side edge of the base portion and a downwardly facing slot 55 intersects and extends outwardly from bore 50 to the opposite side edge of the base portion defining a pair of oppositely extending relatively thin (e.g., 0.075 inch) connecting wall portions 56, 57 The slot means defined by slots 54, 55 provide a high degree of flexibility in the wall portions adjacent bore 50 facilitating assembly and resilient flexible relative movement in use.

The attachment member 12 is made of one integral piece of molded plastic material, a polycarbonate or "D" shore urethane being presently preferred, which is a harder more rigid material than the identification member. The member 12 comprises a base portion 60, a head portion 61, and shaft means in the form of an integral shaft portion 62 for connecting the base portion and the head portion. The base portion 60 has a generally annular peripheral configuration of 0.875 inch diameter, as seen in plan view, with generally parallel flat upper and lower surfaces 63, 64, of 0.1 inch thickness, adapted to extend generally horizontally in the mounted position, connected by a rounded side wall surface 66. Shaft portion 62 is cylindrical with an outside diameter equal to (e.g., 0.3 inch) or slightly smaller than the diameter of bore 50 so as to have a close sliding fit therewithin and has an axial length of 0.5 inch. The head portion 61 is of conical shape with a conical surface 68 extending upwardly a distance of 0.3 inch from a substantial flat downwardly facing annular abutment surface 70, having an outside diameter of 0.4 inch, to an upwardly facing sharp point 72. The length of the head portion is slightly shorter (e.g., 0.05) inch than the length of the conical slot 52 so as to be loosely received therewithin in the mounted position.

The head portion 61 and abutment surface 70 provide second tag attaching means cooperable with the first tag attaching means on the identification member to fixedly hold the tag assembly on the animal ear. The distance between the upper surface 63 of the base portion 60 and the abutment surface 70 of member 12 and the thickness of base portion 14 of member 11 are such as to be slightly less (e.g., 0.35 inch) than the thickness of the animal ear so that, in the mounted position, the upper surface 63 of base portion 60 of member 12 and the lower surface 26 of base portion 14 of member 11 are firmly seated against the lower and upper surfaces of the animal ear with the downwardly facing abutment surface 70 of member 12 firmly seated on the upper surface 28 of the base portion 14 of member 11 circumjacent the bore 50.

While the inventive concepts are applicable to various kinds of animals, the tag assembly hereinbefore disclosed is particularly adapted for use with animals of bovine species. As generally illustrated in FIGS. 2 and 3, the ear of bovine type animals comprises a generally horizontally extending upper portion 80 which interconnects a relatively short vertically downwardly extending front lobe portion 82 terminating in a lower anterior border 83 and a relatively long vertically downwardly extending rear lobe portion 84 terminating in a posterior border 85. In general, the ear tapers outwardly and is relatively thin at the outer edges. There is an area 86 of the animal ear closely adjacent the animal head which I have discovered to be particularly well suited for mounting of the animal tag assembly of the present invention. The area 86 is located along the ear portion 80 approximately one-third the distance from the juncture of the ear and the animal head to the outer end of the ear. The area 86 is characterized by being composed of relatively thick and dense material while providing a relatively flat generally horizontally extending upwardly facing outer surface 88 and a relatively flat generally horizontally extending downwardly facing inner surface 90. In addition, at the area 86, an inner pocket 92 is provided between the front and rear lobe portions 82, 84 which is relatively free of hair whereas an abundance of hair is often found at other areas of the ear which often obscures the conventinal hanging tags of the prior art.

In the assembled position of the ear tag assembly of the present invention, the attachment member 12 is located within the ear pocket 92 with the flat upper surface 63 of the base portion 60 of the member in abutting engagement with the flat downwardly facing surface 90 of the ear portion 80. Thus there is no possibility of any foreign materials being caught on the base portion during any activity of the animal. In addition, there is little likelihood of dirt or other foreign material accumulating about the member 12 so that the danger of infection at the time of piercing of the ear, and afterward, is substantially reduced. The arrangement is such that the area of contact between the base portion and the ear will not itself cause any irritation to the ear. In this connection, it is contemplated that the shaft portion may be connected to the base portion by a curved surface (not shown) to eliminate all sharp edges or corners in the area of contact. Shaft portion 62 extends through the ear portion 80 and through the bore 50 in the base portion 24 of identification member 11. Annular abutment surface 72 tightly abuttingly engages the portions of upper surface 28 circumjacent bore 50 to forcibly press the base portions 14, 60 toward one another thereby fixedly permanently securing the members 11, 12 in place on the animal ear. Conical head 61 is loosely located in the conical slot 52 in indicia portion 16 of the identification member 11 so as not to interfere with any bending or twisting movement imparted to the identification member in use on the animal. The oversize relationship between the head portion and the slot also facilitates assembly by permitting the head portion to be moved beyond the assembly position.

The identification member is located on the upper surface 88 of ear portion 80 with lower surface 26 of the base portion 14 in close fitting abutting engagement therewith. The size and shape of the base portion 14 is such as to fit on the upper ear surface 88 with little or no overlap relative to the correspondingly configured flat ear area 86. In addition, the upper peripheral edges of the base portion are rounded. By reason of the foregoing arrangement, the likelihood of foreign materials being caught on or accumulating around the base portion 14 is greatly reduced so that the possibility of injury and infection are reduced. Since the base portion is located on an upper surface of the ear where the length of the hair is considerably shorter and where the hair tends to lay flat against the ear and hang downwardly along the sides of the ear, the tendency for foreign matter to accumulate is greatly reduced. The lower slot 55 in the base portion will provide a drainage path for any material which does accumulate around shaft portion 62.

The indicia portion 16 of member 11 normally stands vertically upright relative to the base portion 16 but it is highly flexible and resilient so as to be easily bent 90° to a generally horizontal position and easily twisted in any direction under forces applied in use on the animal. Thus, anytime the animal rubs against an object or bumps into a fence rail or the like or moves its head along barbed wire or the like, the identification member is virtually snag proof and the indicia portion 16 has virtually unlimited resilient movement relative to the base portion 14 to substantially eliminate injury to the animal or damage to the ear tag assembly.

In order to mount the identification tag assembly on the ear of an animal, a conventional plier-like tool, having a pair of pivotally mounted members, is utilized with the identification member releasably mounted in jaw means on one member and the attachment member releasably mounted in jaw means on the other member. The innermost portion of the animal ear, next adjacent the animal head, is placed between the jaw portions and the jaw portions are pivotally moved toward one another with the result that the sharp point on the conical head portion pierces and is driven upwardly through the animal ear, the conical head portion is then forced through the undersized bore with the walls of the bore being resiliently outwardly expanded to permit passage of the conical head therethrough, and after the abutment surface 70 clears the bore 50, the walls of the bore resiliently contract to the normal unstressed position with abutment surface 70 firmly irremovably seated on the upper surface of the base portion. The identification tag member is thus permanently fixed to the animal ear in a vertically upstanding position. It may be noted that slots 54, 56 define relatively thin opposite wall portions adjacent the bore 50 so as to facilitate assembly by reducing the resistance to passage of the conical head through the bore without affecting the desired stability of the installation since there are only two thin wall portions located on opposite sides of the bore 50 and on opposite side surfaces of the base portion. In addition, the slots 54, 56 increase the relative flexibility of member 11 relative to member 12. It is to be understood that the dimensional characteristics of the assembly are given herein solely by way of illustration and that the dimensional characteristics may be varied as necessary or desirable to obtain the desired stability of the assembly. In this connection, it is contemplated that the area of shoulder 70 may be increased to provide greater overlap on surface 28 to increase the retaining force between the conical head and the base portion 14. In addition, the relative diameters of the shaft portion 62, the bore 50, and the surface 70 may be reduced in order to reduce the ear puncture area to facilitate installation, to reduce the possibility of infection, to promote the healing of the area, to reduce the loss of circulation in the ear, and to increase the stability of the installation.

Furthermore, it is contemplated that various details of construction of the illustrative embodiment of the inventive concepts hereinbefore described may be variously otherwise embodied. Therefore, it is intended that the appended claims be construed to cover alternative embodiments of the invention except insofar as limited by the prior art.

I claim:

1. An ear tag assembly for an animal of the bovine species of which the ear extends generally laterally outwardly of the animal head with a frontal downwardly extending lobe portion, a rear lobe portion, and an upper interconnecting portion having upper outer and lower inner surfaces between the lobe portions, comprising:

an identification member adapted to be fixedly mounted on the upper outer surface of the upper interconnecting portion of the animal ear next adjacent the animal head, said identification member comprising:

a base portion having a downwardly facing lower abutment surface adapted to abuttingly engage the upper outer surface of the upper interconnecting portion of the ear, an identification portion extending upwardly laterally outwardly from said base portion in a plane generally transverse to said downwardly facing lower abutment surface so as to be located in a vertical upright position when said downwardly facing lower abutment surface abuttingly engages the upper outer surface of the upper interconnecting portion of the ear, and first tag attaching means on said base portion for holding said identification member on the ear with said downwardly facing lower abutment surface in abutting engagement with the upper outer surface of the upper interconnecting portion of the ear; and an attachment member adapted to be fixedly mounted on the lower inner surface of the upper interconnecting portion of the animal ear next adjacent the animal head, said attachment member comprising:

an upwardly facing abutment surface adapted to abuttingly engage the lower inner surface of the upper interconnecting portion of the ear, shaft means adapted to extend generally parallel to the plane of said identification portion for fixedly interconnecting said identification member and said attachment member, said shaft means being adapted to extend vertically through the upper interconnecting portion of the animal ear, and second tag attaching means cooperable with said tag attaching means on said base portion for holding said upwardly facing abutment surface in abutting engagement with the inner lower surface of the upper interconnecting portion of the ear.

2. The invention as defined in claim 1 and further comprising:

an upwardly facing upper surface on said base portion, an aperture extending through said base portion between said downwardly facing lower surface and said upwardly facing upper surface, and said attachment member comprising a base portion having an upper surface providing said upwardly facing abutment surface abutting the lower surface of the upper interconnecting portion of the animal ear, said shaft means being provided by an attachment shaft portion attached to said base portion of said attachment member and extending upwardly therefrom through the upper interconnecting portion of the animal ear and through said aperture, and said second tag attaching means being located on the upper end of said shaft portion for abutting retaining engagement with said upper surface on said base portion of said identification member to interconnect and hold said identification member and said attachment member on the animal ear.

3. The invention as defined in claim 2 wherein:

said identification member being made of one piece resilient compressible molded plastic material, said attachment member being made of one piece of relatively hard molded plastic material, said second tag attaching means comprising an enlarged head portion on said shaft portion, said shaft portion being of smaller cross-section than said aperture so as to be loosely slidably received therewithin, said head portion being of larger cross-section than said aperture so as to be forcibly slidably received therewith during assembly, and a downwardly facing abutment surface on said head portion engageable with said upper surface on said base portion of said identification member to fixedly hold said identification member on the upper outer surface of the upper intermediate portion of the animal ear.

4. The invention as defined in claim 3 and wherein:

said identification portion of said identification member comprising front and rear facing generally vertically extending side surfaces, and said side surfaces being sufficiently closely spaced to define a relatively thin wall resiliently flexibly connected to said base portion of said identification member to permit resilient flexing movement of said identification portion relative to said base portion from a normal generally vertically extending position to various laterally transversely displaced positions under externally applied force.

5. The invention as defined in claim 4 and wherein:

said identification portion being centrally connected to said base portion substantially midway between opposite side edges of said base portion, said aperture being centrally located in said base portion in general vertical alignment with said identification portion, said identification portion having a slot therein above said aperture in said base portion, and said head portion of said shaft portion of said attachment member being loosely received in said slot.

6. The invention as defined in claim 5 and wherein:

said head portion on said shaft portion of said attachment member having a conical surface facilitating passage through said aperture in said base portion of said identification member, and said slot in said identification portion of said identification member being conical and loosely receiving said head portion therewithin.

7. The invention as defined in claim 4 and wherein:

said base portion of said identification member being substantially wider than said identification portion and having a width sufficient to provide sufficient area for said lower surface of said base portion to firmly seat said base portion on the upper surface of the upper connecting portion of the animal ear.

8. The invention as defined in claim 3 and wherein:

said head portion on said shaft portion of said attachment member having a conical surface facilitating passage through said aperture in said base portion of said identification member.

9. The invention as defined in claim 8 and wherein:

said conical surface terminating in a sharp piercing point for piercing and penetrating the animal ear during assembly.

10. The invention as defined in claim 3 and wherein:

said base portion of said identification member having slot means extending outwardly from said aperture for providing wall portions of reduced thickness next adjacent said aperture for facilitating forceful movement of said head portion through said aperture during assembly.

11. The invention as defined in claim 10 and wherein:

said slot means comprises a first slot in the upper surface of said base portion of said identification member extending outwardly in a first direction and a second slot in the lower surface of said base portion of said identification member extending outwardly in a second opposite direction.

12. An animal tag assembly for mounting in a vertical attitude on the ear of an animal, the ear comprising a frontal downwardly extending lobe portion, a rear lobe portion, and an upper interconnecting portion having upper outer and lower inner surfaces between the lobe portions, said tag assembly comprising:

an identification member having a base portion and an identification portion extending upwardly from said base portion, generally in a plane transverse to said base portion, resilient connecting means between said identification portion and said base portion for normally holding said identification portion in a vertical upright position while permitting resilient flexible movement of said identification portion relative to said base portion upon application of externally applied forces, a downwardly facing abutment surface on said base portion extending transversely relative to said identification portion and adapted to seat said identification member on the upper outer surface of the animal ear in the vertical attitude, first tag attaching means on said base portion for mounting said identification member on the upper outer surface of the animal ear, an attachment member having a base portion and a shaft portion extending upwardly from said base portion generally parallel to the plane of said identification portion, an upwardly facing abutment surface on said base portion of said attachment member adapted to seat said attachment member on the lower inner surface of the animal ear, said shaft portion extending vertically a sufficient distance to extend through the upper interconnection portion of the animal ear and beyond the upper outer surface of the animal ear, and second tag attaching means on the upper end of said shaft portion for cooperable engagement with said first tag attaching means on said identification member to fixedly connect said identification member to said attachment member and hold said identification member in the vertical attitude.

13. The invention as defined in claim 12 wherein:

said first tag attaching means comprising a vertical bore extending through said base portion of said identification member and an upwardly facing abutment surface on said base portion of said identification member circumjacent said bore, said second tag attaching means comprising a head portion on the upper end of said shaft portion of larger cross-section than said bore and having a downwardly facing abutment surface which is dimensionally larger than said bore, said shaft portion being dimensioned to be received in said bore, and said upwardly facing abutment surface on said base portion of said attachment member being spaced from said downwardly facing abutment surface on said head portion a distance less than the thickness of the upper interconnecting portion of the animal ear and the thickness of said base portion of said identification member so as to provide resilient compressible engagement between said downwardly facing abutment surface on said head portion and said upwardly facing abutment surface on said base portion of said identification member.

14. The invention as defined in claim 13 wherein:

said bore and said identification portion being in general vertical alignment, a slot in said identification portion above said bore, and said head portion being received in said slot.

15. The invention as defined in claim 14 wherein:

said resilient connecting means comprising a connecting flange portion between said base portion and said identification portion of said identification member, and said slot being centrally located in said connecting flange portion and dividing said flange portion into two space leg portions.

16. The invention as defined in claim 13 further comprising:

an upwardly facing slot in said base portion of said identification member intersecting said bore and extending laterally outwardly therefrom to one side edge of said base portion, and a downwardly facing slot in said base portion of said identification member circumferentially spaced from said upwardly facing slot and extending laterally outwardly from said bore to another edge of said base portion.

* * * * *